(12) United States Patent
Liu

(10) Patent No.: US 7,047,687 B2
(45) Date of Patent: May 23, 2006

(54) FISHING FLOAT FOR POSITIONING, DETECTING FISH CATCH AND LIGHTING

(76) Inventor: Huan-Chung Liu, 2F., No. 16, Lane 154, Jhongjheng Rd., Sindian City, Taipei (TW)

( * ) Notice: Subject to any disclaimer, the term of this patent is extended or adjusted under 35 U.S.C. 154(b) by 0 days.

(21) Appl. No.: 10/757,440

(22) Filed: Jan. 15, 2004

(65) Prior Publication Data
US 2005/0155272 A1   Jul. 21, 2005

(51) Int. Cl.
*A01K 93/02* (2006.01)
(52) U.S. Cl. ............................. 43/17.5; 43/17
(58) Field of Classification Search .................... 43/17, 43/17.5
See application file for complete search history.

(56) References Cited

U.S. PATENT DOCUMENTS

| | | | | |
|---|---|---|---|---|
| 4,461,114 A | * | 7/1984 | Riead | 43/17.5 |
| 4,748,761 A | * | 6/1988 | Machovina | 43/17 |
| 4,884,355 A | * | 12/1989 | Neihoff et al. | 43/17 |
| 5,199,205 A | * | 4/1993 | Klammer | 43/17 |
| 5,758,449 A | * | 6/1998 | Munsterman et al. | 43/17 |
| 5,898,372 A | * | 4/1999 | Johnson et al. | 340/573.2 |
| 5,974,721 A | * | 11/1999 | Johnson et al. | 43/17.6 |
| 5,986,552 A | * | 11/1999 | Lyons | 340/573.2 |
| 6,098,322 A | * | 8/2000 | Tozawa et al. | 37/414 |

* cited by examiner

*Primary Examiner*—Kurt Rowan
(74) *Attorney, Agent, or Firm*—Bacon & Thomas, PLLC

(57) ABSTRACT

An inductive device for fishing. The device includes an inductive circuit board, an inductive coil, an inductive shaft and a spring. The device includes of a lighting circuit board, a plurality of LEDs and a pedestal. In the process of sea fishing, since the float base is designed with a flat bottom, it is maintained at a fixed place to indicate where the fish hook is without being driven back to the shore by waves. The inductive shaft while being pulled down by a caught fish, will leave the induced range of inductive coil, at this moment, and the central LEDs will emit red light and the out-border blue LEDs will continue to light. If there is no catch of fish on the fish hook, the central LEDs will not emit red light, but the out-border LEDs will continue to emit blue light.

5 Claims, 3 Drawing Sheets

FISHING FLOAT FOR POSITIONING, DETECTING FISH CATCH AND LIGHTING

FIELD OF THE INVENTION

This invention is related to an improved fishing float, in particular, the fishing float includes a float base with a flat bottom. The bright light emitted by the float shows the fisherman where the fish hook is and the float indicates whether a fish is caught or not.

BACKGROUND OF THE INVENTION

The float and night vision light are necessities for night fishing which provides the fisherman the indication of a fish catch. There are diverse floats and night vision lights available for use in fishing independently or in combination thereof for the fisherman to see clearly the response of the float. However, most floats are designed with a round bottom, which makes it easy for the waves to drive them back to the sea shore. If the float is too far away and the night vision light is not available, there is no advance warning signal to indicate whether a fish are caught or not. Furthermore, the night vision light uses batteries that are difficult to dispose of, and this becomes an environmental problem. The prior art float is unable to provide positioning and identification of a fish catch without the aid of the night vision light.

SUMMARY OF INVENTION

The main object of this invention is to provide a float for easy positioning and bright lighting to reveal an early signal of a fish catch without the aid of a night vision light. The main improvement is to add to the float an inductive device and the lighting device along with a base and a top lid. The inductive device comprises an inductive circuit board, an inductive coil, an inductive shaft and a spring. The lighting device contains the light circuit board, LEDs and a pedestal. The base bottom is a flat design. This combination is suitable for pond fishing and sea fishing. Because the flat bottom always keeps the float at a fixed place, the waves do not drive the float back to shore. When the fish bites the bait (attached to a hook and line connected to the float), the inductive shaft is pulled down and this action causes the inductive coil to leave its induced range. At this instant, the central LED emits a red light and the outer LEDs continue to emit blue light. In other words, if the fish is not biting, only the blue light is visible, and no red light is visible. The flat bottom design and the change of light colors (a combination of blue light with the red light) serve as a warning signal the moment a fish bites the bait on the fish hook.

The invention is explained in great detail with the aid of embodiments as illustrated in the attached drawings.

DETAILED DESCRIPTION OF THE INVENTION

Figure 1:
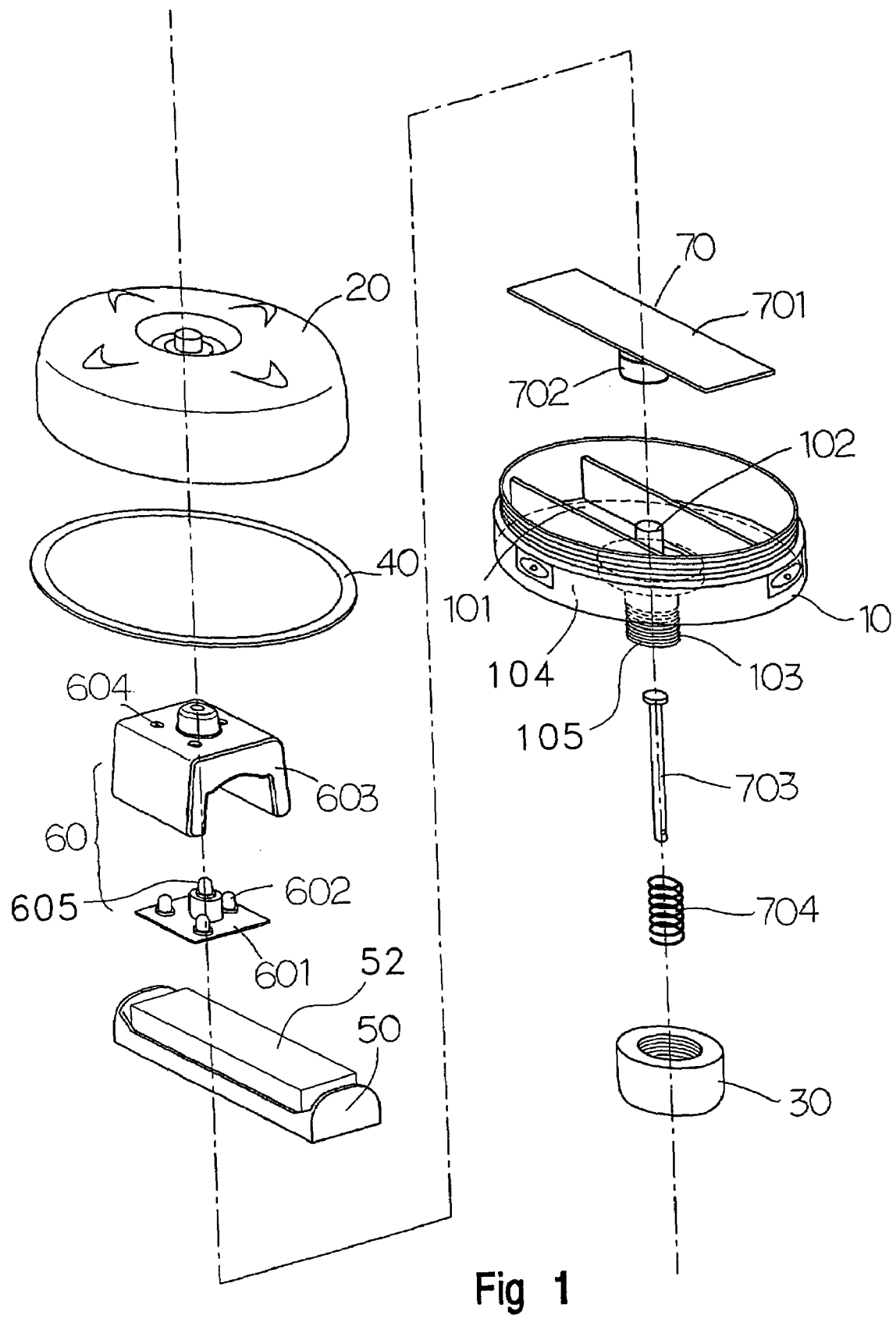
FIG. 1 shows an exploded view of the float of this invention.
Figure 2:
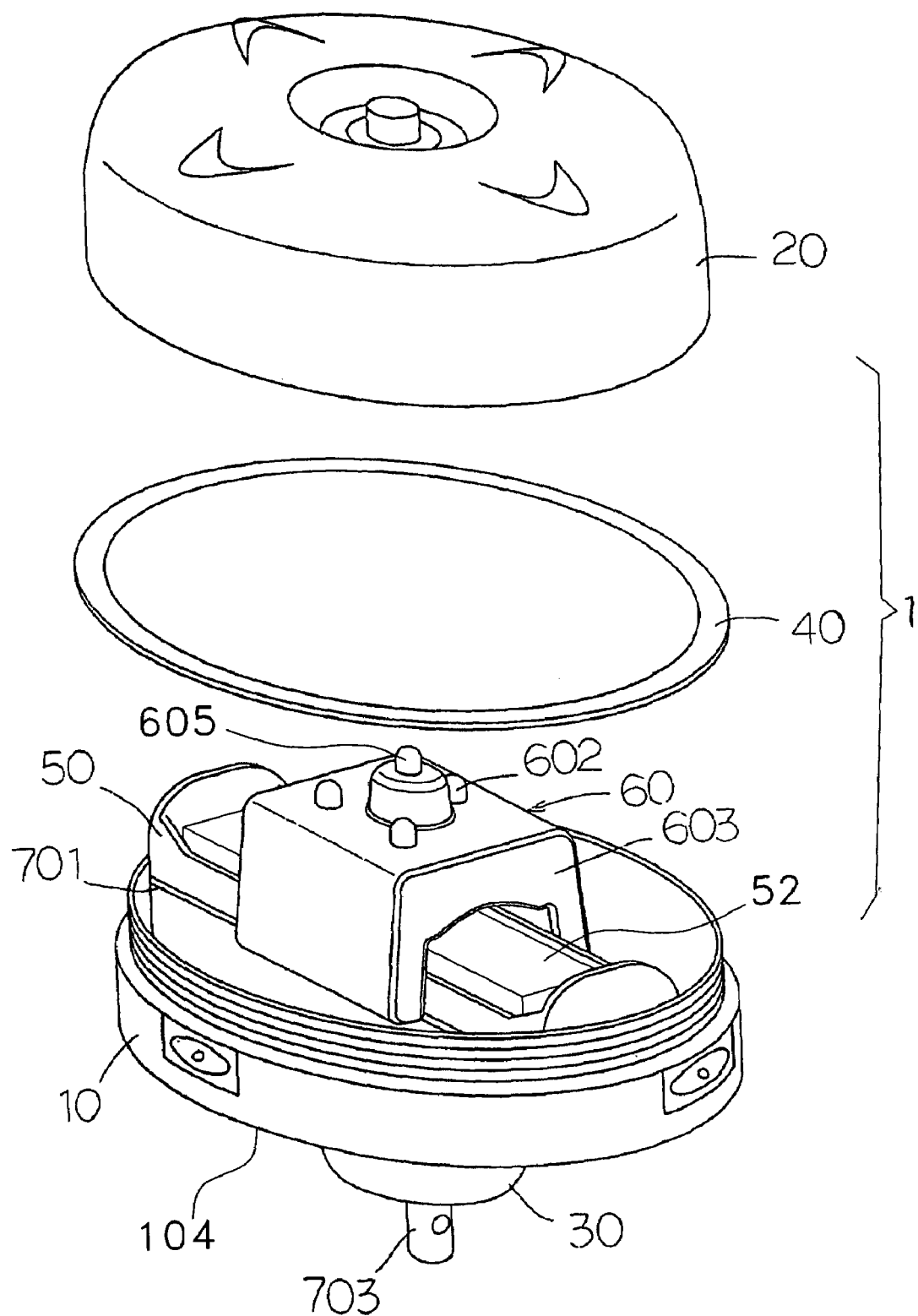
FIG. 2 shows a partially exploded view of the float of this invention.

Please refer to FIGS. 1 and 2. The float (1) consists of a base (10) with a flat bottom (104), a top lid (20), a lock bolt (30), a waterproofing washer (40), a battery compartment (50), a light device (60) and an inductive device (70). The base (10) includes a round housing separated into an empty compartment (101). A central hollow post (102) forms a connecting rod (103) having outer threads (105) at the lower end of the central hollow post (102). The base (10) is linked to the inductive coil (702). The lock bolt (30) has an inner thread to be locked on to the connecting rod (103). Because the bottom of the base is a flat design, it tends to float at a fixed place and is unaffected by sea waves.

The top lid (20) is a round casing made of the transparent material so that the red light emitted from the red light emitting diode LED (605) or the blue light emitted from the light-emitting diodes LEDs (602) of the lighting device (60) are clearly visible.

The waterproof washer (40) sits between the top lid (20) and the base (10) to keep the water from entering into the base (10).

The battery compartment (50) for a battery is housed in the space formed by the top lid (20) and the base (10). A battery (not shown) is the power source for the lighting device (60) and the inductive device (70).

The lighting device (60) is mounted on top of the battery compartment (50). The lighting device (60) comprises the lighting circuit board (601), LEDs (602) and the pedestal (603). The lighting circuit board (601) is linked to the LEDs (602). The central protruded LED is red which is only activated when a fish pulls at bait attached to the float device via a hook. Blue LEDs surround the red LED. The pedestal (603) has a plurality of holes (604) permitting the LEDs (602) to extend out of the holes (604) so the red and blue lights are visible from outside of the transparent top lid (20).

The inductive device (70) is placed under the battery compartment (50), consisting of an inductive circuit board (701), an inductive coil (702), an inductive shaft (703) and spring (704).

The circuit board (701) is housed in the empty compartment (101) in the base (10). The inductive coil (702) encircles the central post (102). The inductive shaft (703), the spring (704) and the connecting rod (103) will be held together by the lock bolt (30) but one end of the inductive shaft (703) will extend out of the lock bolt (30) but it is prevented from falling out of the lock bolt (30). The size or type of the spring (704) is commensurate with the weight of the fish the fisherman intends to catch. The outer end of connecting rod (703) as shown in FIGS. 2 and 3 is connected to a hook, line and bait (not shown).

Figure 3:
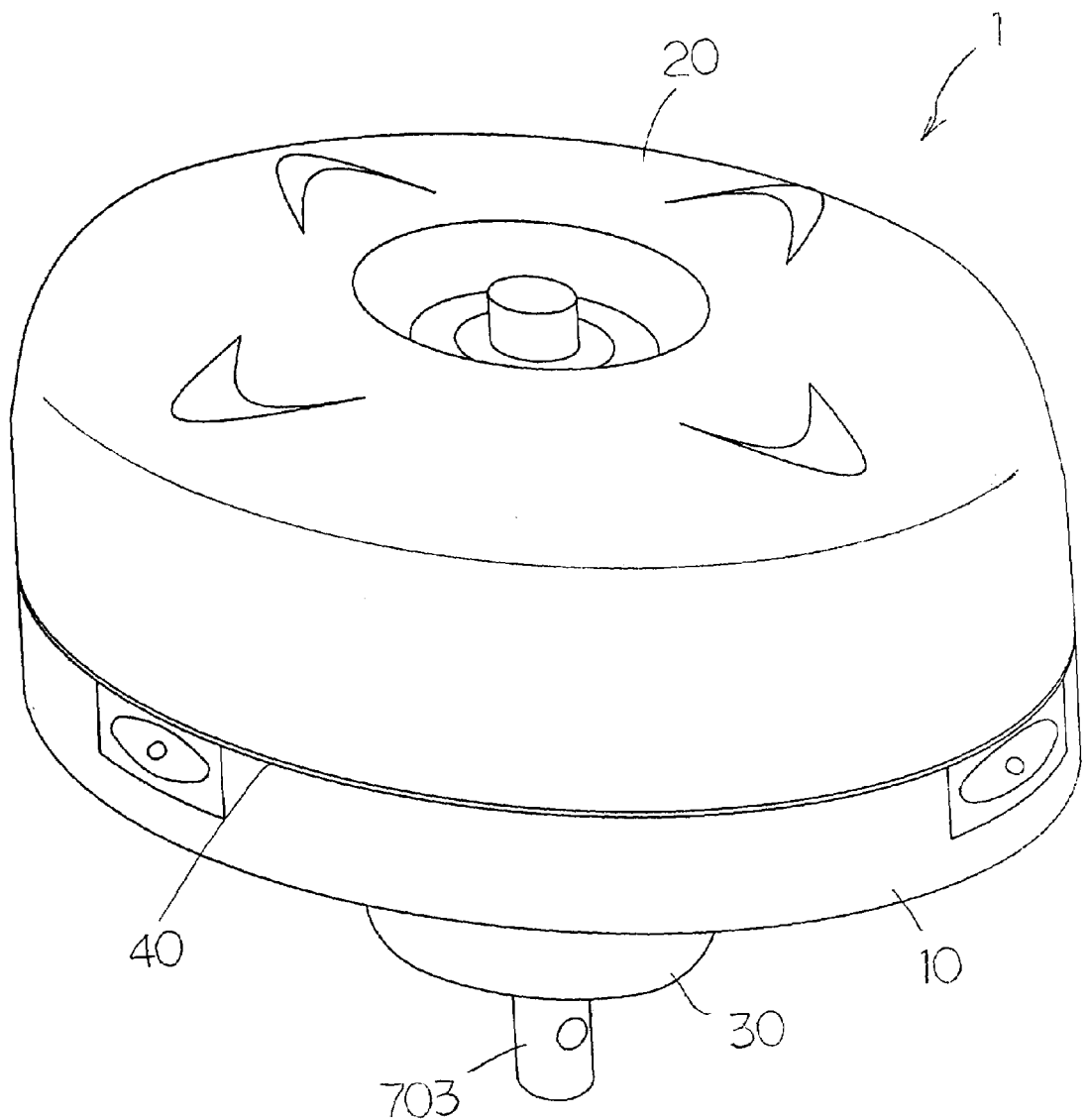
FIG. 3 shows a schematic view of the assembled float of the invention.

As shown in FIG. 3, the float (1) is easily visible and floats at a stationary position.

In practice, the float (1) of this invention tends to float at a fixed place and is not easily pushed by the waves to the shore. If the fish bites the bait on the hook secured to an end of the inductive shaft (703) by a line, the inductive shaft (703) is pulled downwards from the inductive device (70), and leaves the induced range of the inductive coil (702). The central LED 605 on the lighting device (60) will then emit the red light LED and the blue LEDs (602) surrounding the lighting device (60) will continue emitting blue light. If no fish is bitting, only the blue LEDs (602) of the lighting device (60) will light. Since the base (10) is designed with a flat bottom (104), it is always buoyed up at a fixed place away from the shore. The different light combination (blue lights plus red light) of the LEDs (602) and 605 of the lighting device (60) gives the fisherman visible warning signals.

The invention claimed is:

1. A fishing float comprising:
   a base having a round shape, an inductive device housed in the base, the base includes a central hollow post, an inductive coil of the inductive device encircles the central hollow post, the central hollow post is extended out of the base and forms a connecting rod, and an inductive shaft is housed therein;
   a top lid configured as a round casing comprises a transparent material;
   a lighting device comprises a central light-emitting diode and surrounding light-emitting diodes emitting light color different from that of the central light-emitting diode, the light-emitting diodes are visible through the top lid;
   a lock bolt includes an inner thread configured to lock with the connecting rod;
   a waterproof washer positioned between the top lid and the base to prevent water from entering the fishing float;
   a battery compartment housed in a space between the base and the top lid, the battery compartment is configured to receive a power source to power the lighting device and the inductive device;
   the inductive device is mounted under the battery compartment and provides the induced signal of a fish catch; and
   an end of the inductive shaft that extends out of the lock bolt is securable to a fishing hook and line, when the inductive shaft is pulled by a fish the inductive coil activates the central light-emitting diode of the lighting device, which indicates to the user that a fish is pulling at the fishing float.

2. The fishing float as claimed in claim 1, wherein the base comprises a flat bottom.

3. The fishing float as claimed in claim 1, wherein the lighting device comprises a lighting circuit board, the light-emitting diodes and a pedestal, the light-emitting diodes are linked to the lighting circuit board and the light-emitting diodes extend out of respective holes on the pedestal so that the light emitting diodes are visible through the top lid, and the pedestal holds the lighting circuit board.

4. The fishing float as claimed in claim 3, wherein the central light-emitting diode emits red light and the light-emitting diodes surrounding the central light-emitting diode emit blue light, with the lighting of the central light-emitting diode indicting that a fish is pulling at the fishing float.

5. The fishing float as claimed in claim 1, wherein the connecting rod includes outer threads configured to receive the lock bolt.

* * * * *